US009698551B2

(12) United States Patent
Evans et al.

(10) Patent No.: US 9,698,551 B2
(45) Date of Patent: Jul. 4, 2017

(54) MOUNT FOR PORTABLE ELECTRONIC DEVICES

(71) Applicant: TomTom International B.V., Amsterdam (NL)

(72) Inventors: Nicholas Alexander Evans, Amsterdam (NL); Mark Lee Dempsey, Beckenham (GB); Reinier Tijssen, Eindhoven (NL); Daniel Browning, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 194 days.

(21) Appl. No.: 14/799,609

(22) Filed: Jul. 15, 2015

(65) Prior Publication Data

US 2016/0268750 A1 Sep. 15, 2016

(30) Foreign Application Priority Data

Mar. 9, 2015 (GB) .................................. 1503987.8

(51) Int. Cl.
*H01R 31/00* (2006.01)
*H01R 35/00* (2006.01)

(52) U.S. Cl.
CPC ............. *H01R 35/00* (2013.01); *H01R 31/00* (2013.01)

(58) Field of Classification Search
CPC ................................ H01R 35/00; H01R 31/00
USPC ..................................................... 439/11, 310
See application file for complete search history.

(56) References Cited

U.S. PATENT DOCUMENTS

| 5,995,366 A | 11/1999 | Howell et al. |
| 7,243,514 B2 | 7/2007 | Frantz |
| 8,191,851 B2 | 6/2012 | Crown |
| 8,711,553 B2 | 4/2014 | Trinh et al. |
| 9,019,698 B2 | 4/2015 | Thiers |

(Continued)

FOREIGN PATENT DOCUMENTS

| DE | 20316714 U | 6/2004 |
| WO | 2005035924 A1 | 4/2005 |
| WO | 2014170467 A1 | 10/2014 |

OTHER PUBLICATIONS

TomTom Rider Anti-Theft Solution (TomTom), Jun. 3, 2013 [Online] Available from: http://www.amazon.co.uk/TomTom-Anti-Theft-Solution-Rider-Europe-/dp/B00BQ9W4NK/ref=sr_1_25?ie=UTF8&qid=1440084554&sr=8-25&keywords=tomtom+rider+accessories [Accessed: Aug. 20, 2015].

(Continued)

*Primary Examiner* — James Harvey
*Assistant Examiner* — Oscar C Jimenez

(57) ABSTRACT

A mount for a portable electronic device is disclosed comprising: a support member arranged to engage against a surface of a device mounted thereto, the support member comprising a power connector having one or more electrical contacts to deliver electrical power to the device. The mount further comprises a first ring member coupled to the support member and a second ring member configured for attachment to a surface. The first ring member is configured to be rotatable relative to the second ring member, and the surface of the first ring member is provided adjacent to the surface of the second ring member. The first and second ring members also provide an aperture to enable an electronic connection to pass through the aperture to the power connector of the support member.

20 Claims, 6 Drawing Sheets

(56) References Cited

U.S. PATENT DOCUMENTS

| | | | |
|---|---|---|---|
| 9,163,433 B2 | 10/2015 | Sedon | |
| 9,240,651 B2* | 1/2016 | Thiel | H01R 13/62977 |
| 9,285,832 B2 | 3/2016 | Galant | |
| 2013/0026322 A1 | 1/2013 | Wheeler et al. | |
| 2014/0260443 A1 | 9/2014 | Grziwok et al. | |
| 2014/0302700 A1* | 10/2014 | Makinen | H01R 13/56 |
| | | | 439/353 |
| 2014/0355200 A1 | 12/2014 | Thiers | |
| 2014/0356667 A1* | 12/2014 | Kim | H01R 39/00 |
| | | | 429/90 |
| 2014/0357094 A1* | 12/2014 | Kim | H01R 39/00 |
| | | | 439/13 |
| 2015/0292669 A1 | 10/2015 | Floersch et al. | |
| 2015/0305518 A1 | 10/2015 | Galant | |

OTHER PUBLICATIONS

Search report of United Kingdom application No. GB1503987.8, dated Jul. 23, 2015.
Search report of United Kingdom application No. GB1504724.4, dated Aug. 27, 2015.

* cited by examiner

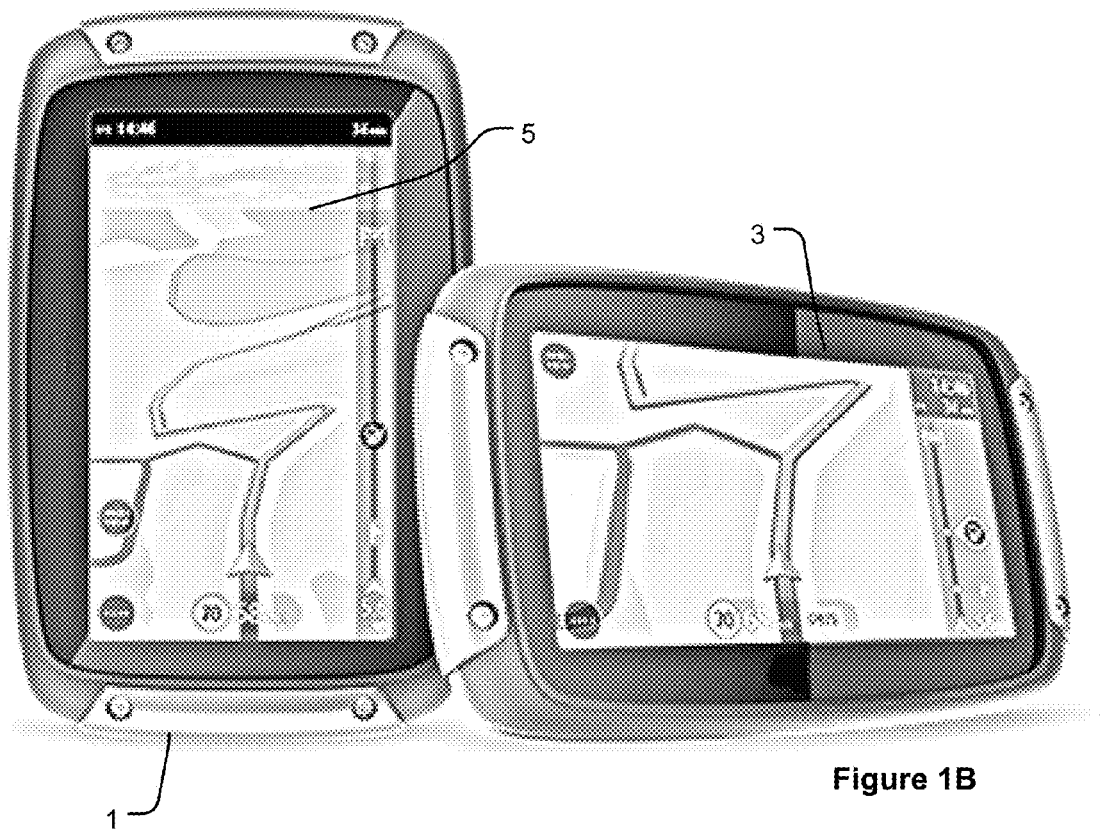

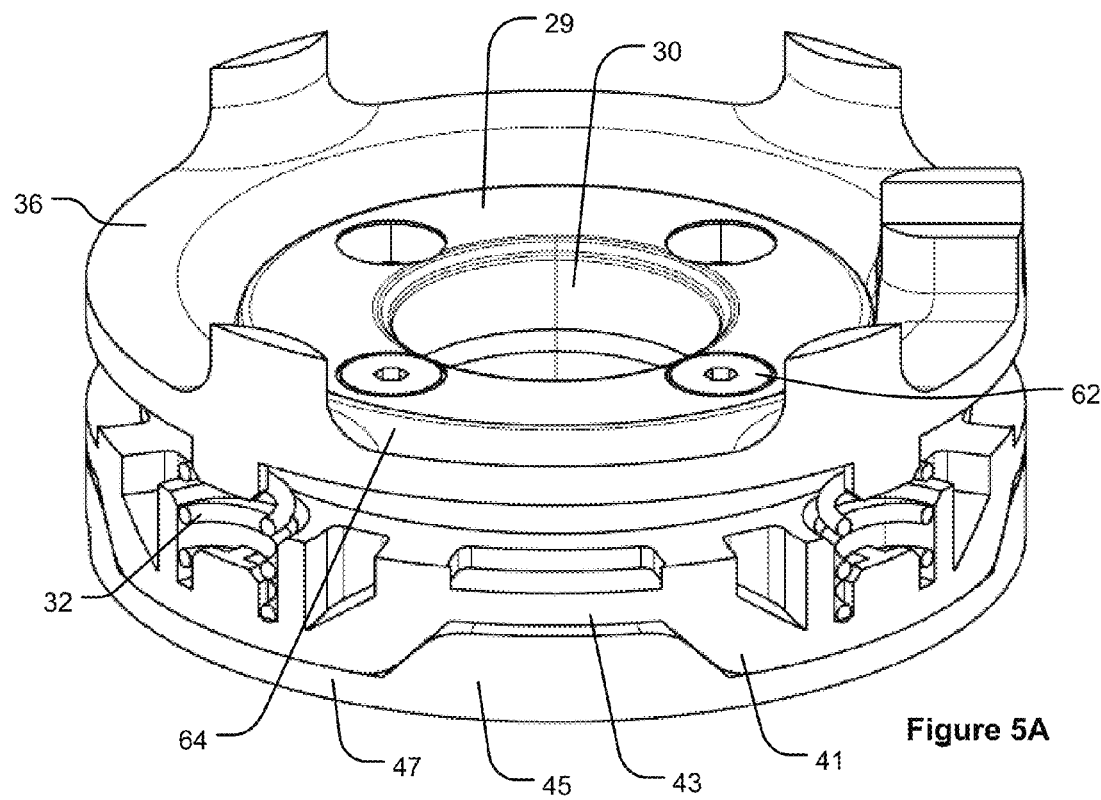
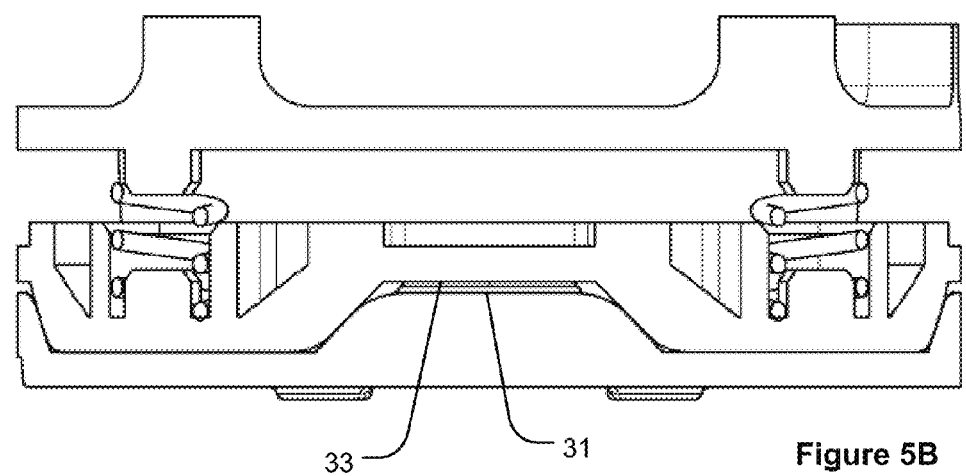

61

MOUNT FOR PORTABLE ELECTRONIC DEVICES

CROSS-REFERENCES TO RELATED APPLICATIONS

The application claims priority to United Kingdom Patent Application No. 1503987.8, filed Mar. 9, 2015; the entire contents of which is incorporated herein by reference.

FIELD OF THE INVENTION

The present invention relates to a mounting assembly for portable electronic devices, such as such as mobile phones, smart phones, PDAs, tablet computers, other handheld personal computers, portable audio systems (e.g. radio players, MP3 players, etc), multimedia players, games consoles, and portable navigation devices (so-called PNDs). In embodiments, the invention is more specifically related to a mounting assembly for a portable navigation device configured for use with a motorcycle.

BACKGROUND TO THE INVENTION

There is a growing number or portable electronic devices which are capable of displaying information on a display device in a number of orientations, e.g. a portrait orientation, a landscape orientation, etc, and that often display different information depending on the orientation of the electronic device. One such type of portable electronic device is a navigation device, which are designed to be mounted on or within vehicles, and that provide functionality such as navigation, route planning, traffic updates, etc. Various mounting solutions have been developed that can support a portable electronic device in a number of different orientations, although often the user is required to remove the device from the mount before it can be docked again in a different orientation. It can also be problematic with known mounting solutions to allow for a device to be mounted in a plurality of orientations, while simultaneously providing power to the device using a power connector. These problems with known mounting solutions are a particular issue when mounting a portable electronic device, such as a navigation device, to a motorcycle or other similar type of vehicles like scooters, mopeds, etc. There therefore remains a need for improved mounting solutions for portable electronic devices, and in particular portable navigation devices, that mitigate or reduce some of the above problems.

SUMMARY OF THE INVENTION

According to an aspect of the present invention there is provided a mount for a portable electronic device, comprising:

a support member arranged to engage against a surface of a device mounted thereto, the support member comprising a power connector having one or more electrical contacts to deliver electrical power to the device;

a first ring member coupled to the support member, wherein the first ring member comprises a surface comprising a plurality of detents, the detents forming recesses therebetween; and a second ring member configured for attachment to a surface, wherein the second ring member comprises a surface comprising a plurality of detents, the detents forming recesses therebetween, wherein the detents and recesses of the surface of the second ring member are shaped to correspond to the detents and recesses of the surface of the first ring member, wherein the first ring member is configured to be rotatable relative to the second ring member, and wherein the surface of the first ring member is provided adjacent to the surface of the second ring member such that the detents of the first ring member engage with the recesses of the second ring member at a plurality of different angular positions when the first ring member is rotated relative to the second ring member, and wherein the first and second ring members provide an aperture to enable an electronic connection to pass through the aperture to the power connector of the support member.

This provides the advantage that the mount allows the portable electronic device, such as a navigation device, to be provided in different angular positions. For instance the device may be provided in a landscape or a portrait orientation. The detents and corresponding recesses cause the provision of haptic feed back to the user so that the user can feel when the mount is in a locked position. The aperture which is provided though the mount may enable a simple electrical connection to be provided to the device, while still allowing for the rotation of the device into a plurality of different angular positions.

In embodiments, the second ring member comprises a detent ring and a rear housing, the surface of the second ring member being provided on the detent ring, and wherein the detent ring is provided between the first ring member and the rear housing. The detent ring may be coupled to the rear housing so that the detent ring does not rotate relative to the rear housing. The detent ring may be coupled to the rear housing so that the detent ring can move axially relative to the rear housing.

In embodiments, the first ring member comprises a detent housing and an assembly ring, wherein the assembly ring is coupled to the detent housing with the second ring member therebetween so that a constant separation is maintained between the detent housing and the rear housing. The surface of the first ring member may be provided on the detent housing.

In embodiments, the mount further comprises one or more biasing members positioned between the first and second ring members so as to bias the detent ring against the detent housing and maintain a contact between the surfaces of the first and second ring members. The one or more biasing members may be positioned between the rear housing and the detent ring. The one or more biasing members may be in a compressed state when the first ring member has been rotated to be in an angular position with the second ring member so that the detents of the surface of the first ring member engage with the detents of the surface of the second ring member. As will be appreciated, when the one or more biasing members are in a compressed state, then the mount can be said to be in an unlocked position. The one or more biasing members may be in a relaxed state when the first ring member has been rotated to be in an angular position with the second ring member so that the detents of the surface of the first ring member engage with the recesses of the second ring member. As will be appreciated, when the one or more biasing members are in a relaxed state, then the mount can be said to be in a locked position. The one or more biasing members may comprise at least one spring.

In embodiments, the aperture is provided through the centre of the first and second ring members. The aperture may be provided by an alignment of apertures in each of the detent housing, detent ring, rear housing and assembly ring.

In embodiments, the number of detents of the surfaces of the first and second ring members corresponds to a maximum number of locked positions of the mount. The number of detents may be four, although it will be appreciated that any number may be used as desired. The detents of the surfaces of the first and second ring members may be equally spaced from each other. The detents of the surfaces of the first and second ring members may be angled on their leading and trailing edges, the angled edge formed an oblique angle to the surface of the respective preceding or succeeding recess.

In embodiments, the rear housing may comprise means for fixedly attaching the mount to the surface. The surface may, for example, be a surface of a motorcycle of similar vehicle.

In embodiments, the mount may further comprise an electrical cable coupled to the power connector of the support member, the electrical cable passing through the aperture formed by the first and second ring members.

A mount as described hereinabove may be used to mount a portable electronic device, preferably a portable navigation device (PND), to a power connector in a vehicle such as a car, motorbike, bicycle, or boat, for example. The mount may further comprise one or more of: data storage means; a power adaptor; a voltage transformer; a loudspeaker, mobile telecommunication circuitry or devices; and a global navigation satellite system (GNSS) receiver, such as a global positioning system (GPS) receiver. The one or more electrical contacts of the power connector may be connected by a suitable circuitry to such electronic devices where provided in the mount.

The invention may find use in mounting a portable electronic device that has a touch screen device. The portable electronic device may comprise a mobile phone, smart phone, PDA, portable audio system (e.g. radio player, MP3 player), multi-media player, games console, tablet computer, portable personal computer or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various preferred embodiments of the present invention will now be described, by way of example only, and with reference to the following figures, in which:

FIGS. 1A and 1B illustrate a navigation device in landscape and portrait orientations;

FIGS. 5A and 5B illustrate portions of the mounting assembly in a first or "locked" position.

DETAILED DESCRIPTION OF THE INVENTION

Figure 2A:
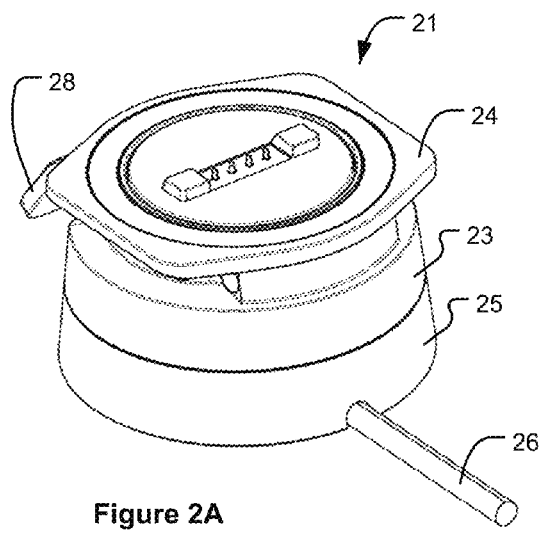
FIGS. 2A to 2D illustrate a mounting assembly for the navigation device.

The present invention, at least in preferred embodiments, relates to an active dock that provides an electrical connection for portable electronic devices that may be removably connected to a mount, in particular to portable navigation devices (PNDs) that may be mounted to a motorcycle or other similar vehicle, such as scooter or moped. It is an aim of the present invention to provide a compact and attractive mounting solution wherein a user can rotate a docked device, and which provides good haptic feedback to the user such that it is clear to the user, even when wearing gloves, that the device is in a correct orientation from a plurality of possible orientations. The terms "mount", "dock" and "mounting assembly" are used interchangeably through the description, and unless the context requires otherwise reference the same product.

The Figures illustrate a mount 21 for a portable electronic device 1, comprising: a support member 24 arranged to engage against a surface of a device mounted thereto, the support member comprising a power connector 22 having one or more electrical contacts to deliver electrical power to the device; a first ring member 23 coupled to the support member 22, wherein the first ring member comprises a surface 31 comprising a plurality of detents 45, the detents forming recesses 47 therebetween; and a second ring member 25 configured for attachment to a surface, wherein the second ring member comprises a surface 33 comprising a plurality of detents 41, the detents forming recesses 43 therebetween, wherein the detents and recesses of the surface of the second ring member are shaped to correspond to the detents and recesses of the surface of the first ring member, wherein the first ring member 23 is configured to be rotatable relative to the second ring member 25, and wherein the surface 31 of the first ring member is provided adjacent to the surface 33 of the second ring member such that the detents 45 of the first ring member engage with the recesses 43 of the second ring member at a plurality of different angular positions when the first ring member is rotated relative to the second ring member, and wherein the first and second ring members provide an aperture 30 to enable an electronic connection to pass through the aperture to the power connector of the support member 24.

FIGS. 1A and 1B illustrate an example portable navigation device 1 having a display device, which may comprise a touchscreen display. The navigation device 1 may be configured to execute navigation software so as to provide one or more navigation-related features, such as route planning, guidance along a planned route, current location information, traffic information, estimated time of arrival at a destination, alternative route suggestions, favourite destinations, etc.

In FIG. 1A the navigation device is provided in a landscape orientation. A representation of a digital map 3 is displayed on the display 5 of the navigation device 1, the representation being displayed showing a route to be followed.

In FIG. 1B the navigation device 1 is provided in a portrait orientation. The same representation of the digital map 3 is displayed on the display 5, however, due to the different orientation, more information about the road in front of the user can be shown to the user. This may be useful to provide the user with information about the bends or other hazards in the road ahead.

Figure 2B:
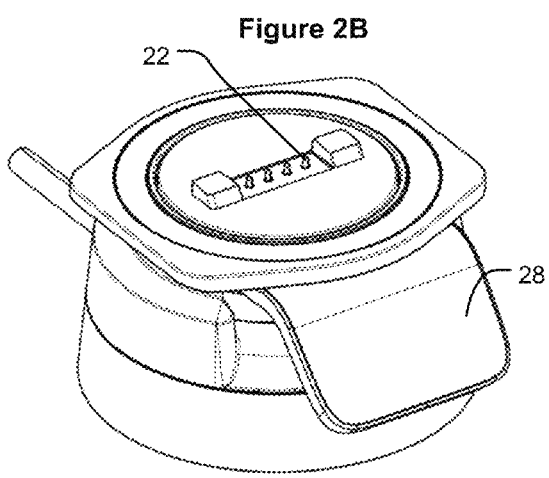
Figure 2C:
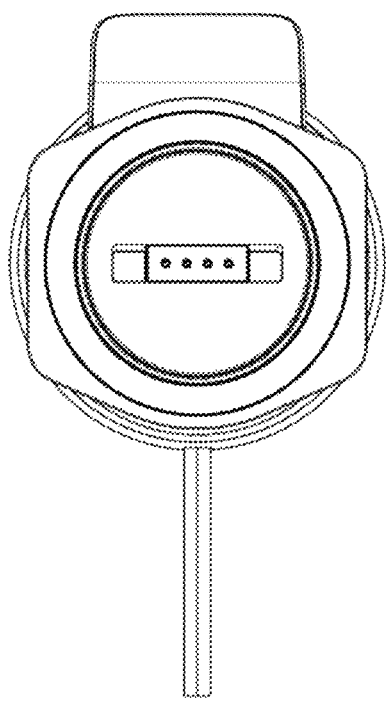
Figure 2D:
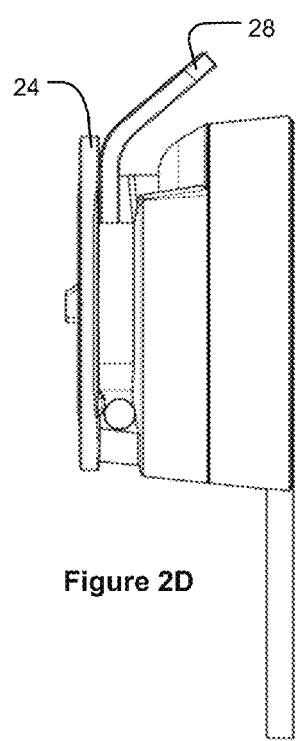

FIGS. 2A to 2D illustrate an example mounting assembly 21 for the navigation device 1. The mounting assembly 21 may be configured to be attached to a motorcycle or any other suitable vehicle. FIG. 2A illustrates a lower view of the mounting assembly 21, FIG. 2B illustrates an upper view of the mounting assembly 21, FIG. 2C illustrates a front view of the mounting assembly 21 and FIG. 2D illustrates a side view of the mounting assembly 21. While the mount assembly of the present invention is described herein primarily with reference to a portable navigation device, it will be appreciated that the described mount can be used with any type of portable electronic device having a display screen, such as a portable personal computer, mobile telephone, smart phone, PDA, portable audio system (e.g. radio player, MP3 player), multi-media player, games console or tablet computer, and which is arranged to operate in different orientations. Similarly, while the mounting assembly is particularly beneficial when mounted to a motorcycle or other similar vehicle, the mounting assembly can be arranged to be mounted to any suitable surface, whether of a vehicle or not, as desired.

The mounting assembly 21 comprises a support member 24, a first ring member 23 and a second ring member 25. The first ring member 23 and the second ruing member 25 are configured to be rotatable relative to each other. Examples of the rotation mechanism which may be provided within the mounting assembly 21 are illustrated in FIGS. 3 to 6B and described below.

The support member 24, which is coupled to the first ring member 23, may be configured for attachment to a rear of the navigation device 1. The support member 24, which may be in the form of a front plate, comprises a plurality of electrical contacts 22 which may be configured to connect to corresponding connections on the rear of a navigation device 1. It is to be appreciated that other means for attaching the support member 24 to a navigation device 1 may be used in other embodiments of the invention.

In the example of FIGS. 2A to 2D the mounting assembly 21 also comprises a paddle 28. The paddle 28 may be configured to enable a user to release and/or attach the navigation device 1 to the support member (or front plate) 24. In some examples the paddle 28 may be configured to enable a user to release the navigation device 1 by depressing the paddle 28.

The second ring member 25 of the mounting assembly 21 may be configured for attachment to a vehicle such as a motorcycle or any other suitable vehicle. The second ring member 25 comprises the rear of the mounting assembly 21. The second ring member 25 may be attached to a vehicle by any suitable means.

In the example of FIGS. 2A to 2D the mounting assembly also comprises an electrical connection 26. The electrical connection 26 may comprise wires or any other suitable means which may be used to provide power and/or data to the navigation device 1. The electrical connection 26 may be connected to the electrical contacts 22 to enable power and/or data to be provided to the navigation device 1. The electrical connection 26 may extend from the rear of the front plate 24 through both the first ring member 23 and the second ring member 25 of the mounting assembly 21 and out of the second ring member 25. The electrical connection 26 may extend through an aperture 30 within the mounting assembly 21. Examples of the aperture are illustrated in FIGS. 3 to 6B and described below.

Figure 3:
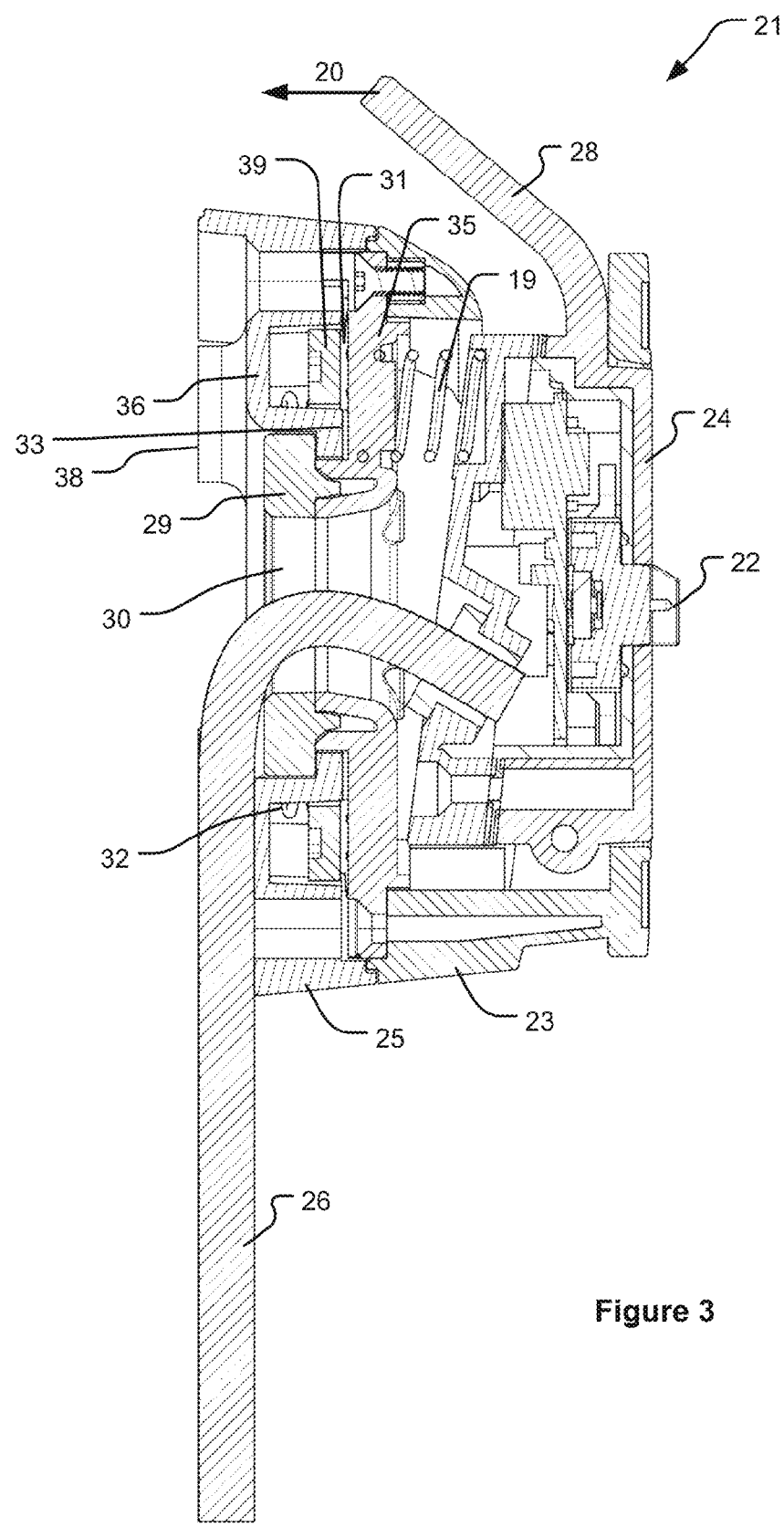
FIG. 3 illustrates a cross section through the mounting assembly.

FIG. 3 illustrates a cross section through the mounting assembly 21. The mounting assembly 21 comprises a first ring member 23 and a second ring member 25 as described above. Corresponding reference numerals are used for corresponding features.

The first ring member 23 may be coupled to a support member (or front plate) 24 and paddle 28 as described above. The paddle 28 may be configured to enable a user to release a navigation device 1 form the front plate 24 by depressing the paddle 28. The user may depress the paddle 28 by applying a force in an axial direction towards the rear of the mounting assembly 21 as indicated by the arrow 20. When the user pushes the paddle 28 this also moves the front plate 24 in an axial direction towards the rear of the mounting assembly 21. This disengages the electrical contact 22 from the navigation device 1 and also allows the user to remove the navigation device 1 from the mounting assembly 21.

A first biasing member 19 may be provided between the paddle 28 and the second ring member 25. The first biasing member 19 may be configured to push the front plate 24 outwards, away from the second ring member 25. In the example of FIG. 3 the first biasing member 19 comprises a spring. When the user depresses the paddle 28 this may compress the spring. When the user releases the paddle 28 the spring restores the front plate 24 and the paddle 28 to their original position.

The first ring member 23 also comprises a first surface 31. The first surface 31 is provided internally of the mounting assembly 21. The first surface 31 may comprise a plurality of detents and recesses as described below.

In the example embodiments the first surface 31 is provided on a detent housing 35. The detent housing 35 is coupled to the front plate 24 so that the front plate 24 does not rotate relative to the detent housing 35. The detent housing 35 may also be coupled to the second ring member 25 so that the detent housing can move rotationally relative to the second ring member 25. The detent housing 35 may be coupled to the second ring member 25 so that the detent housing does not move axially relative to a rear plate 38 of the second ring member 25.

The second ring member 25 provides the rear of the mounting assembly 21. The second ring member 25 comprises a rear housing 36. The rear housing 36 may comprise a rear plate 38. The rear plate 38 may form the rear surface of the mounting assembly 21.

The second ring member 25 also comprises a second surface 33. The second surface 33 is provided internally of the mounting assembly 21. The second surface 33 may also comprise a plurality of detents and recesses as described below. The detents and recesses of the second surface 33 may be configured to correspond to the detents and recesses of the first surface 31. The detents and recesses of the second surface 33 may be configured to correspond to the detents and recesses of the first surface 31 so that the detents of the second surface 33 fit tightly into the recesses of the first surface 31.

The second surface 33 is provided adjacent to the first surface 31. The second surface 33 is provided adjacent to the first surface 31 so that at least a part of the first surface 31 touches the second surface 33. The first and second surfaces 31, 33 are arranged so that when the first ring member 23 rotates relative to the second ring member 25 the detents of the second surface 33 engage and/or disengage with the recesses on the first surface as the first surface 31 slides over the second surface 33.

In the example embodiments the second ring member 25 comprises a detent ring 9 and a rear housing 36. The second surface 33 may be provided on the detent ring 39. The detent ring 39 may be coupled to the rear housing 36 so that the rear housing 36 does not rotate relative to the detent ring 39. The detent ring 39 may be coupled to the rear housing 36 so that the detent ring 39 does move axially relative to the rear housing 36. For example, the detent ring 39 may have a profiled surface that interlocks with a corresponding profiled surface of the rear housing 36, such that the detent ring 39 always rotates with the rear housing 36, i.e. the detent ring and the rear housing always maintain a constant angular relationship. The detent ring 39 may be configured to move axially relative to the rear housing 36 when the first ring member 23 is rotated relative to the second ring member 25. This may maintain constant separation between the rear housing 36 and the first ring member 23.

The second ring member 25 also comprises one or more second biasing members 32. The second biasing members 32 are provided within the rear housing 36. The second biasing members 32 may be positioned between the rear housing 36 and the detent ring 39 and configured to bias the detent ring 39 against the first ring member 23. In the example of FIG. 3 the second biasing members 32 may comprise one or more springs.

The example mounting assembly 21 of FIG. 3 also comprises an assembly ring 29. The assembly ring 29 may be configured to connect the detent housing 35 to the rear housing 36. The assembly ring 29 may be configured to prevent axial movement of the detent housing 35 relative to the rear housing 36. However the assembly ring 29 may allow axial movement of the detent ring 39 relative to the rear housing 36.

The mounting assembly 21 also comprises an aperture 30. The aperture 30 provided through the centre of the first ring member 21 and the second ring member 23. The aperture 30 extends through both the detent housing 35 and the detent ring 39.

The aperture 30 may be configured to enable the electrical connection 26 to pass through the mounting assembly 21 to the front plate 24. This enables a simple electrical connection 26 to be provided, while still allowing for the rotation of the first ring member 23 relative to the second ring member 25.

The rear housing 36 may be coupled to a rear plate 38. The rear plate 38 may comprise means for fixedly attaching the mount 21 to a surface, e.g. a surface of a motorcycle. The means may comprise a number of screw holes or other similar bolting means.

Figure 4A:
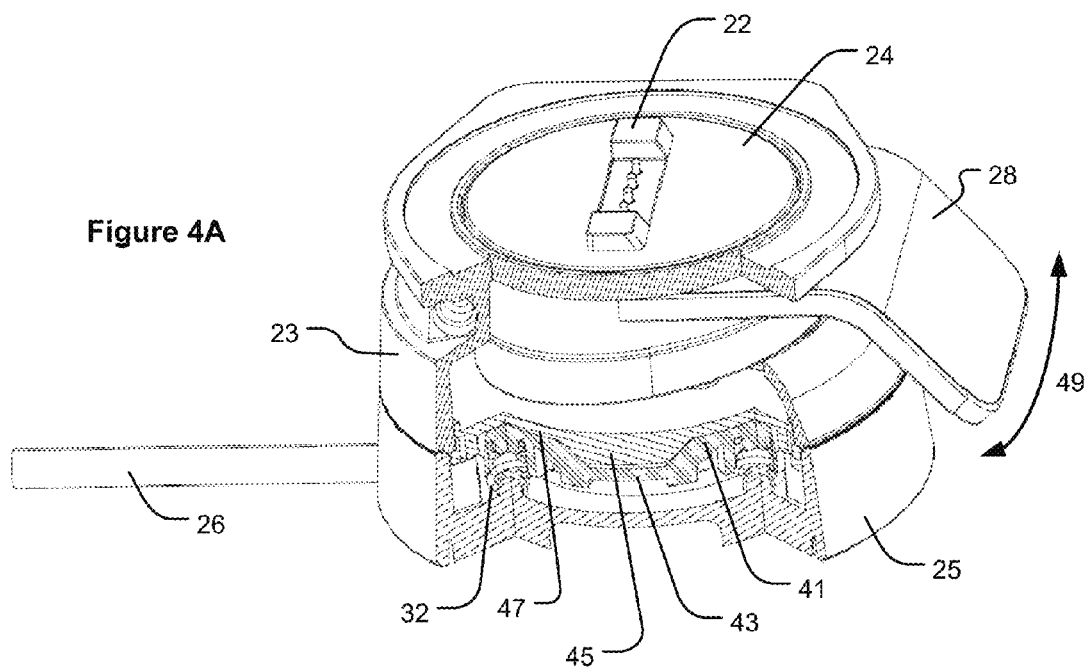
FIGS. 4A and 4B illustrate partial cut outs of the mounting assembly.
Figure 4B:
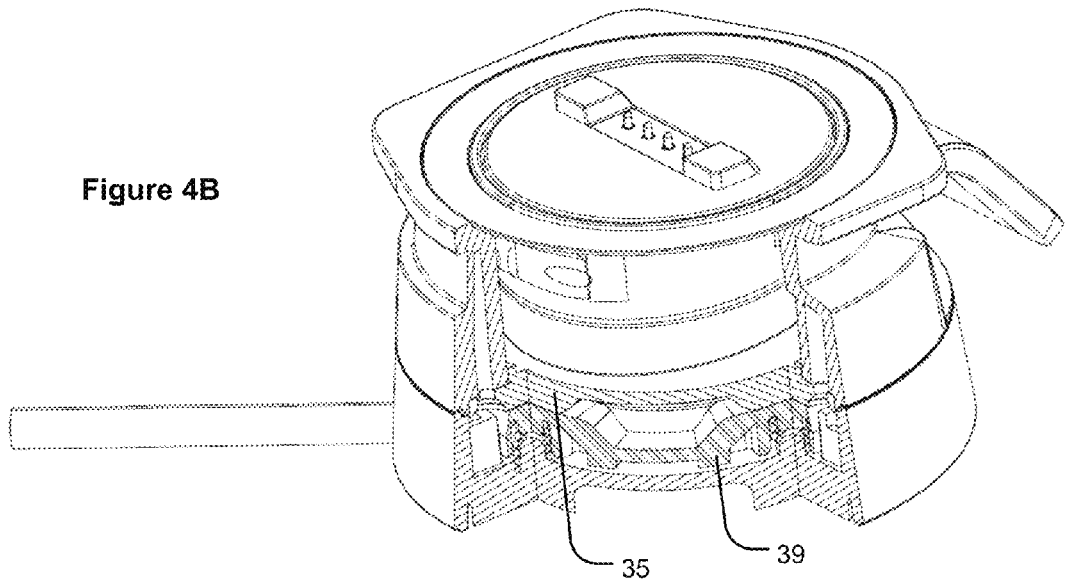

FIGS. 4A and 4B illustrate partial cut outs of the mounting assembly 21. Corresponding reference numerals are used for corresponding features. In the example of FIG. 4A the mounting assembly 21 is arranged in a first or "locked" configuration. In the example of FIG. 4B the mounting assembly 21 is arranged in a second or "unlocked" configuration. When the mounting assembly 21 is in the locked configuration the first ring member 23 can only be rotated relative to the second ring member 25 if the user applies a force which is above a threshold. When the mounting assembly 21 is in the unlocked configuration the first ring member 23 may be rotated relative to the second ring member 25 even if the user applies a force which is below the threshold.

The mounting assembly 21 comprises a detent ring 39 and a detent housing 35 which may be provided within the first and second ring members 23, 25 as described above. The first surface 31 is provided on the detent housing 35 and comprises a plurality of detents 45 and recesses 47. The second surface 33 is provided on the detent ring 39 and comprises a plurality of corresponding detents 41 and recesses 43. As will be appreciated, the recesses in the surfaces are typically caused simply by the presence of the detents. Although recesses may be provided into the detents as desired.

In the locked configuration of FIG. 4A the detents 41 of the detent ring 39 are engaged within the recesses 47 of the detent housing 35. The detents 45 of the detent housing 35 may also be engaged within the recesses 43 of the detent ring 39. When a detent 41, 45 is engaged with a recess 47, 43 the detent 41, 45 fits tightly into the recess 47, 43 so that the detent 41, 45 can only be moved out of the recess 47, 43 if a user applies a force which is above a threshold. When the mounting assembly 21 is in a locked configuration all, or almost all, of the first surface 31 may be in contact with the second surface 33.

In the examples of FIGS. 4A and 4B the biasing member 32 comprises a spring. The spring pushes the detent ring 39 close to the detent housing 35. The spring may allow for gap to be provided between the detent ring 39 and the rear plate 38.

A user may be able to move the mounting assembly out of the locked position of FIG. 4A by applying a sufficient rotational force as indicated by the arrow 49. In the examples of FIGS. 4A and 4B the detents 41, 45 have angled edges (at their leading and trailing edges). The angled edges form an oblique angle to the respective preceding or succeeding recess. The angled surfaces may enable the detents 41, 45 to be pushed out of the recesses 47, 43 by applying sufficient force, i.e. to move the mount 21 out of the locked position. Similarly, the angled surfaces may guide the detents 41, 45 into the recesses 47,43 when the first ring member 23 is rotated relative to the second ring member 25, i.e. to move the mount 21 into the lock position. The recesses 47, 43 may be shaped to correspond to the detents 41, 45.

In the example of FIGS. 4A and 4B the detents 41, 45 and recesses 47, 43 are symmetrical so that each side of the detent 41, 45 is provided at the same angle. This may enable a user to rotate the portions of the mounting assembly both clockwise and anti-clockwise.

In FIG. 4B the user has rotated the mounting assembly 21 of FIG. 4A though approximately 45° so that the mounting assembly 21 is now provided in an unlocked or intermediate configuration. In this position the detent 45 of the detent housing 35 has been removed from the recess 43 of the detent ring 39 so that the detents 45, 41 are now disengaged. The detent 45 of the detent housing 35 now abuts a detent 41 of the detent ring 39. This pushes the detent ring 39 back towards the rear housing 36 and compresses the spring 32. When the mounting assembly 21 is in an unlocked configuration the detents 45 of the first surface 31 may be the only part of the first surface which is in contact with the second surface 33. In the unlocked position only a small portion of the first surface 31 is in contact with the second surface 33.

In the unlocked position the detents 45, 41 are disengaged. This means that there is little resistance to the rotational movement of the detent housing 35 relative to the detent ring 39. This means that the force required for further rotation of the respective portions of the mounting assembly 21 is less than the force required to move the mounting assembly 21 out of the locked configuration.

If the user continues to rotate the mounting assembly then a further detent 41 of the detent ring 39 would be provided within the recess 47 of the detent housing 39. This would provide a second locked position which may be different to the first locked position.

In some examples four detents and four recesses may be provided on each of the detent housing 35 and the detent ring 39. This may enable four different locked configurations to be provided. Where the detents and recesses are equally spaced around the detent housing 35 and the detent ring 39 this may provide two landscape positions and two portrait positions for the navigation device 1. It is to be appreciated that any number and arrangements of the detents and recesses may be provided in order to enable locked positions at different angular orientations.

FIGS. 5A and 5B illustrate portions of the detent housing 35 and the detent ring 39 of the mounting assembly 21 in a locked configuration. FIG. 5A illustrates a perspective view and FIG. 5B illustrates a cross section.

In the example of FIGS. 5A and 5B four detents 45 and four recesses 47 are provided on the detent housing 35 and similarly four detents 41 and four recesses 43 are provided on the detent ring 39. In the example of FIGS. 5A and 5B the biasing member 32 comprises four springs configured to push the detent ring 39 against the detent housing 35. It can be seen that when the mounting assembly 21 is arranged in the locked configurations there is substantially no gap provided between the detent ring 39 and the detent housing 35.

Figure 6A:
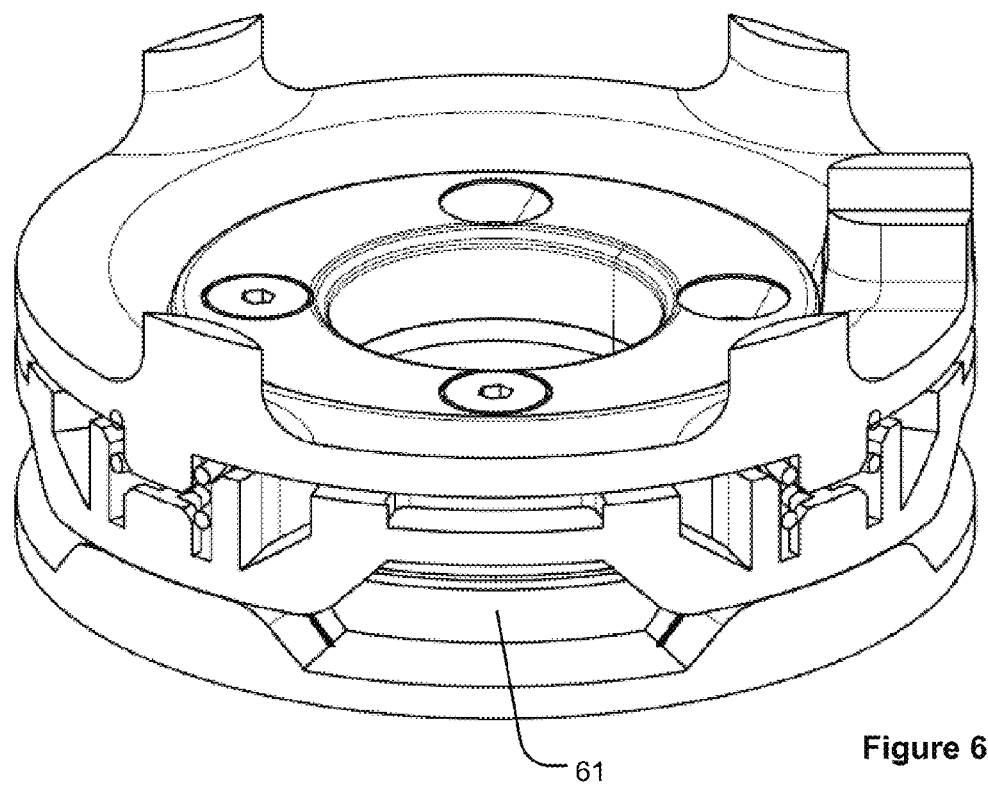
FIGS. 6A and 6B illustrate portions of the mounting assembly in a second or "unlocked" position.
Figure 6B:
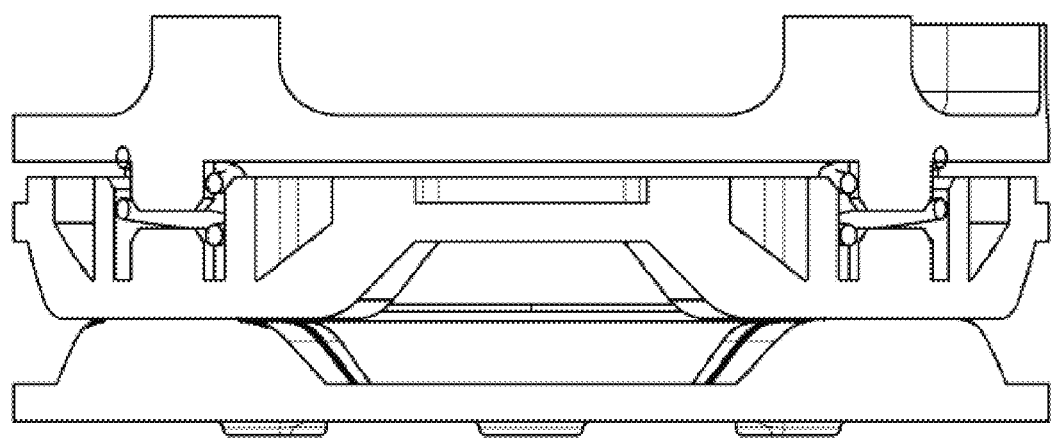

FIGS. 6A and 6B illustrate the mounting assembly 21 of FIGS. 5A and 5B however the mounting assembly 21 is now arranged in an unlocked configuration. FIG. 6A illustrates a perspective view and FIG. 6B illustrates a cross section. As shown in FIG. 6B when the mounting assembly 21 is arranged in the unlocked configurations gaps 61 are provided between the detent ring 39 and the detent housing 35 where the recess 47 of the detent housing 35 overlaps with the recess 43 of the detent ring 39. The detents 45 of the detent housing 35 may overlap with the detents 41 of the detent ring 39 so that, at least some of the first surface 31 remains in contact with the second surface 33.

As can be seen, and as discussed above, an assembly ring 29 is used to maintain the axial separation between the rear housing 36 and the detent housing 35; the assembly ring 29 therefore also causing the springs 32 to be compressed when the mounting assembly 21 is in the unlocked configuration. The assembly ring 29 is attached to the detent housing 35 by a retaining means, such as one or more screws 62. In embodiments 4 or 6 screws are used. The assembly ring 29 has a bevelled surface 64 (cooperating with a similarly bevelled surface of the rear plate 38) to facilitate the rotation of the assembly ring 62 with the detent housing 35 relative to the rear plate 38.

The mounting assembly 21 described above provides a rotational mount which may be suitable for attaching navigation devices 1 to motorcycles or other similar vehicles. Although it will be understood that the rotational mount may be used in a number of other situations and with any other suitable portable electronic device, where it is desired to provide an active mount, i.e. one that has an electrical connection for provided power and/or data transfer, for the electronic device, and one that allows the device to be rotated to a number of different orientations while docked in the mount. The use of the detents 41, 45 and recesses 43, 47 provides good haptic feedback to the user so that they can easily feel when the navigation device 1 is in the locked position. This may be particularly useful to users, such as motorbike riders, who may be wearing protective gloves. The use of the aperture 30 allows the electrical connections 26 to rotate with the navigation device 1. This keeps the electrical connection 26 simpler. This also reduces the number of moving parts within the electrical connection 26 and reduces the chance of failure or fatigue of such components.

As will be appreciated by those skilled in the art, various changes and modifications can be made to the above described embodiments whilst still falling within the scope of the present invention as set forth in the accompanying claims.

The invention claimed is:

1. A mount for a portable electronic device, comprising:
   a support member arranged to engage against a surface of a device mounted thereto, the support member comprising a power connector having one or more electrical contacts to deliver electrical power to the device;
   a first ring member coupled to the support member, wherein the first ring member comprises a surface comprising a plurality of detents, the detents forming recesses therebetween; and
   a second ring member configured for attachment to a surface, wherein the second ring member comprises a surface comprising a plurality of detents, the detents forming recesses therebetween, wherein the detents and recesses of the surface of the second ring member are shaped to correspond to the detents and recesses of the surface of the first ring member,
   wherein the first ring member is configured to be rotatable relative to the second ring member, and wherein the surface of the first ring member is provided adjacent to the surface of the second ring member such that the detents of the first ring member engage with the recesses of the second ring member at a plurality of different angular positions when the first ring member is rotated relative to the second ring member, and
   wherein the first and second ring members provide an aperture to enable an electronic connection to pass through the aperture to the power connector of the support member.

2. The mount as claimed in claim 1, wherein the second ring member comprises a detent ring and a rear housing, the surface of the second ring member being provided on the detent ring, and wherein the detent ring is provided between the first ring member and the rear housing.

3. The mount as claimed in claim 2, wherein the detent ring is coupled to the rear housing so that the detent ring does not rotate relative to the rear housing.

4. The mount as claimed in claim 2, wherein the detent ring is coupled to the rear housing so that the detent ring can move axially relative to the rear housing.

5. The mount as claimed in claim 4, wherein the first ring member comprises a detent housing and an assembly ring, wherein the assembly ring is coupled to the detent housing with the second ring member therebetween so that a constant separation is maintained between the detent housing and the rear housing.

6. The mount as claimed in claim 5, wherein the surface of the first ring member is provided on the detent housing.

7. The mount as claimed in claim 5, further comprising one or more biasing members positioned between the first and second ring members so as to bias the detent ring against the detent housing and maintain a contact between the surfaces of the first and second ring members, and wherein the one or more biasing members are positioned between the rear housing and the detent ring.

8. The mount as claimed in claim 5, wherein the aperture is provided by an alignment of apertures in each of the detent housing, detent ring, rear housing and assembly ring.

9. The mount as claimed in claim 2, wherein the rear housing comprises means for fixedly attaching the mount to the surface.

10. The mount as claimed in claim 1, further comprising one or more biasing members positioned between the first and second ring members so as to bias the detent ring against the detent housing and maintain a contact between the surfaces of the first and second ring members.

11. The mount as claimed in claim 10, wherein the one or more biasing members are in a compressed state when the first ring member has been rotated to be in an angular position with the second ring member so that the detents of the surface of the first ring member engage with the detents of the surface of the second ring member.

12. The mount as claimed in claim 11, wherein the mount is in an unlocked position when the one or more biasing members are in a compressed state.

13. The mount as claimed in claim 10, wherein the one or more biasing members are in a relaxed state when the first ring member has been rotated to be in an angular position with the second ring member so that the detents of the surface of the first ring member engage with the recesses of the second ring member.

14. The mount as claimed in claim 13, wherein the mount is in a locked position when the one or more biasing members are in a relaxed state.

15. The mount as claimed in claim 10, wherein the one or more biasing members comprise at least one spring.

16. The mount as claimed in claim 10, wherein the aperture is provided through the centre of the first and second ring members.

17. The mount as claimed in claim 1, wherein the number of detents of the surfaces of the first and second ring members corresponds to a maximum number of locked positions of the mount.

18. The mount as claimed in claim 1, wherein the detents of the surfaces of the first and second ring members are equally spaced from each other.

19. The mount as claimed in claim 1, wherein the detents of the surfaces of the first and second ring members are angled on their leading and trailing edges, the angled edge formed an oblique angle to the surface of the respective preceding or succeeding recess.

20. The mount as claimed in claim 1, further comprising an electrical cable coupled to the power connector of the support member, the electrical cable passing through the aperture formed by the first and second ring members.

* * * * *

UNITED STATES PATENT AND TRADEMARK OFFICE
CERTIFICATE OF CORRECTION

PATENT NO.        : 9,698,551 B2
APPLICATION NO.   : 14/799609
DATED             : July 4, 2017
INVENTOR(S)       : Nicholas Alexander Evans et al.

Page 1 of 1

It is certified that error appears in the above-identified patent and that said Letters Patent is hereby corrected as shown below:

In the Claims

Column 11, Line 14, Claim 16 should read:
The mount as claimed in claim 1, wherein the aperture is provided through the centre of the first and second ring members.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*